United States Patent [19]

Meunier et al.

[11] Patent Number: 5,067,230
[45] Date of Patent: Nov. 26, 1991

[54] METHOD FOR THE MANUFACTURE OF PLANAR MAGNETIC HEADS BY MAKING CAVITIES IN A NON-MAGNETIC WAFER

[75] Inventors: Paul-Louis Meunier, Paris; Jean-Marc Coutellier, Maurepas; Jean-Claude Lehureau, Sainte Genevieve Des Bots, all of France

[73] Assignee: Thomson-CSF, Puteaux, France

[21] Appl. No.: 541,331

[22] Filed: Jun. 21, 1990

[30] Foreign Application Priority Data

Jul. 4, 1989 [FR] France .................. 89 08962

[51] Int. Cl.⁵ .................................................. G11B 5/42
[52] U.S. Cl. ........................ 29/603; 360/121; 360/122; 360/129
[58] Field of Search ............... 29/603; 360/121, 122, 360/125-127, 129

[56] References Cited

U.S. PATENT DOCUMENTS 3,789,505  2/1974  Huntt ............................. 29/603
4,837,924  6/1989  Lazzari .......................... 29/603

FOREIGN PATENT DOCUMENTS 262028  3/1988  European Pat. Off. .
2605783  4/1988  France .

OTHER PUBLICATIONS

Patent Abstracts of Japan, vol. 12, No. 429 (P-785)(3276), Nov. 14, 1988 & JP-A-63 160006, Jul. 2, 1988, Tetsuya Iwata.

Primary Examiner—Carl E. Hall
Attorney, Agent, or Firm—Oblon, Spivak, McClelland, Maier & Neustadt

[57] ABSTRACT

A method of simultaneous manufacture of a plurality of planar magnetic heads on a wafer or a slab made of non-magnetic material designed to be cut out to separate each head. The method can be applied to magnetic heads of the type including a micro-gap formed between two magnetic poles, facing a gap defined between two wire-wound ferrite cores. The method consists in depositing said thin layer magnetic poles on a first face of a wafer made of non-magnetic material and in hollowing out, in the face opposite to said wafer, at least one cavity for housing said wire-wound cores so as to obtain a calibrated spacing or a junction between the upper part of each of said wire-wound cores and said thin layer magnetic poles.

20 Claims, 4 Drawing Sheets

METHOD FOR THE MANUFACTURE OF PLANAR MAGNETIC HEADS BY MAKING CAVITIES IN A NON-MAGNETIC WAFER

BACKGROUND OF THE INVENTION

1. Field of the Invention

The field of the invention is that of the simultaneous manufacture of a plurality of magnetic heads on a wafer or slab made of non-magnetic material, designed to be cut out to separate each magnetic head.

Planar magnetic heads are used notably for the writing or reading of magnetic tapes of the type used in tape recorders, video tape recorders etc.

2. Description of the Prior Art

In a first known structure of magnetic heads, a gap 10 is hollowed out in a magnetic substrate 11 with winding 12 (FIG. 1) for writing or reading on a moving magnetic tape 13.

In one method for making this type of structure by which it is possible to work with magnetic tapes of high coercivity, magnetic layers 14, 15 with high magnetization at saturation (MIG heads) are added on to the opposite faces of the gap 10. However, this technology has the drawback of being complicated to implement, of not being entirely satisfactory from the industrial point of view because the plane of deposition of the layers is perpendicular to the plane in which the magnetic tracks 13 run.

Magnetic heads with a plane structure, such as the one shown in FIG. 2, were then developed. According to this new known design, thin layers 16, 17 made of a magnetic material, are added on at the gap 10 in a plane parallel to the plane in which the magnetic track 13 moves. The magnetic layer forming the thin layers 16, 17 is chosen so as to generate a field that is more intense than the field generated by the material of the magnetic substrate 13 with high coercivity. This technology corresponds to a different operation of the heads, which notably has valuable properties at high frequency. An advantageous application concerns rotating heads, making it possible to work at high throughput rates (several tens of Mbits/s).

In planar magnetic heads of this type, it is possible to distinguish, firstly, the macrogap 18 which has a size, for example, of the order of 200 to 300 $\mu$m and, secondly, the microgap 10. These dimensions are given as a non-restrictive illustration.

The invention concerns a method for making planar heads of this type.

There is a known method for the batch manufacture of planar heads, as shown in FIG. 3. This method uses a typical slab 30 obtained by being cut out from a ferrite block with a circular cross-section. On its active face, the slab 30 has a plurality of strips 31 made of a non-magnetic material, parallel to one another. These non-magnetic strips are located on top of a cavity 32. The width 33 of each strip 31 corresponds to the macrogap 18 of the planar head shown schematically in FIG. 2. To make the microgaps, a thin layer of magnetic material with a high saturation coefficient is deposited. Finally "bow-ties" 34, 35 are demarcated in the deposit, in the form of thin layers by masking and ion machining operations. The microgaps 36 are finally demarcated between two wings 34, 35 of the "bow-tie" deposits. It is finally possible to cut out the slab 30 along the two perpendicular sets 37, 38 of parallel planes, so as to individually separate each planar head 39.

There are several known methods of implementing this method, notably the one described in the French patent application No. 2 641 111 filed on behalf of the same Applicant. One characteristic of this type of known planar head is that it is made of a slab of magnetic material 30.

An aim of the invention is to provide a method for the fabrication of planar heads in a slab of non-magnetic material, such as silicon, or again $Al_2O_3TiC$, these being indicated as non-restrictive examples.

There is a known method of this type, as described in the French patent application No. 86 14974. However, the slab of non-magnetic material used according to this prior art document has the drawback of forming an obstacle, owing to its thickness, to the crossing of the magnetic radiation between the upper thin layers and the lower gap cores. The invention is aimed at overcoming this drawback.

SUMMARY OF THE INVENTION

More precisely, the invention concerns a method for manufacturing magnetic heads with planar structure, notably for the encoding and reading of magnetic tapes, each of said magnetic heads being of the type having a microgap formed between two magnetic poles, facing a gap defined between two wire-wound ferrite cores. This method consists in the deposition of said magnetic poles made as thin layers on a first face of a wafer of non-magnetic material and in the hollowing out, in the opposite face of said wafer, of at least one housing cavity for said wire-wound cores, so as to obtain a calibrated spacing or a junction between the upper part of said wire-wound cores and said thin layer magnetic poles.

It is possible to distinguish two main embodiments of the invention, depending on whether the cavity-making operation is used to hollow out housings, in the wafer of non-magnetic material, that are designed to receive subsequently attached wire-wound cores, or whether it can be used to form cores, in the very mass of the non-magnetic wafer, that are designed to be coated with magnetic material and then wire-wound.

According to the first embodiment, said wire-wound cores are advantageously formed at least in pairs, on a common substrate, and are wire-wound before being inserted in batches in said housing cavities.

In this case, the common substrate for forming the wire-wound cores consists either of a monoblock counter-piece made of magnetic material, such as ferrite, or of least a module made of magnetic material comprising at least one pair of cores, each module being inserted, after the wire-winding of the cores, between each wafer of non-magnetic material and a holding counter-piece also made of a non-magnetic material.

According to a third variant of this first embodiment, the process of forming the cores consists in machining said non-magnetic part so as to form pads in said second face, and then in depositing a magnetic material on at least one part of the surface of said pads.

In the second embodiment, advantageously each of the said cavities for housing the wire-wound cores is advantageously hollowed out at a microgap formed between two magnetic poles in thin layers, and a layer of magnetic material is deposited on two symmetrical portions of the flanks of said cavity to form said pair of cores associated with said microgap.

Preferably, said cavities are made by forming cores in said second face of the wafer of non-magnetic material, and the windings are formed around said cores with flanks coated at least partially with magnetic material.

According to one characteristic of this second embodiment of the invention, the process of deposition of a layer of magnetic material on the two symmetrical portions of the flanks of said cavity comprises the following steps:
- a resist layer is deposited in the bottom of said cavity;
- said magnetic material is deposited on said symmetrical flank portions of the cavity;
- said resist layer is removed;
- the bridge, if any, formed between said symmetrical deposits of magnetic material on the two symmetrical flank portions of the cavity, is broken;

Irrespectively of the embodiment, the invention provides for the possibility of partially submerging said thin layer pads with microgap in the cavities made in the first face of the wafer of non-magnetic material.

BRIEF DESCRIPTION OF THE DRAWINGS

Other characteristics and advantages of the invention will appear from the following description of some preferred exemplary embodiments of the invention, given as a non-restrictive illustration, and from the appended drawings, wherein.

DESCRIPTION OF THE PREFERRED EMBODIMENTS

Figure 1:
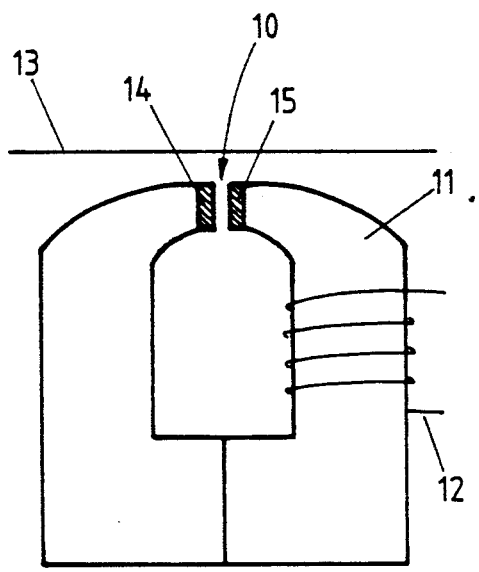
FIG. 1 give a schematic view of the structure of a standard known magnetic head.
Figure 2:
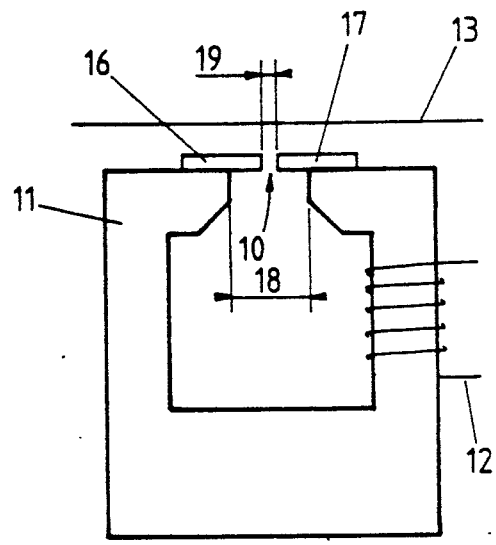
FIG. 2 gives a schematic view of the structure of a planar magnetic head with thin layers and microgap.
Figure 3:
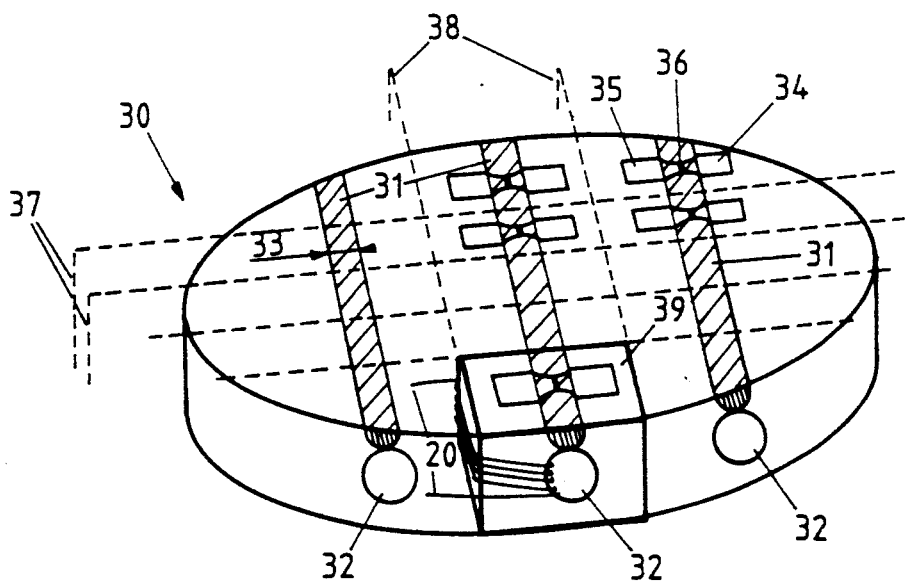
FIG. 3 shows a slab for the batch manufacturing of planar magnetic heads according to a known method.
Figure 4:
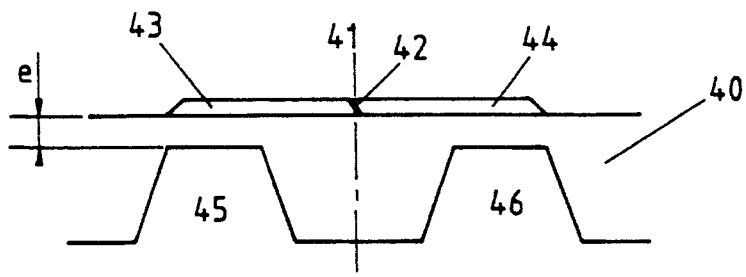
FIGS. 4 and 5 show two alternative methods for making cavities in a wafer of non-magnetic material for the batch manufacture of planar magnetic heads according to the invention.
Figure 5:
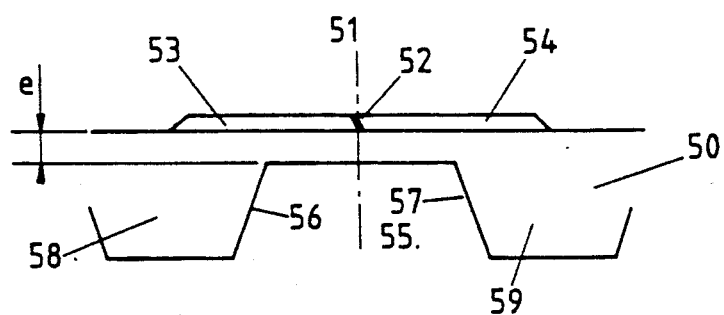

The method of the invention has two main modes of implementation, shown schematically in FIGS. 4 and 5 respectively.

According to the first mode of implementation, the substrate 40 made of non-magnetic material, preferably of Si or Al$_2$O$_3$TiC, is provided with cavities so that two substantially symmetrical cavities 45, 46 frame the plane 41 of the microgap 42 made between the two magnetic poles in thin layers 43, 44.

The cavity-making operation is done, for example, by chemical machining of the slab 40 made of non-magnetic material If necessary, the two cavities 45, 46 may form only one big cavity. In this case, this cavity should be wide enough to be capable of taking the attached wire-wound cores, of the type shown in FIGS. 8, 9, 10 and 11.

Figure 14:
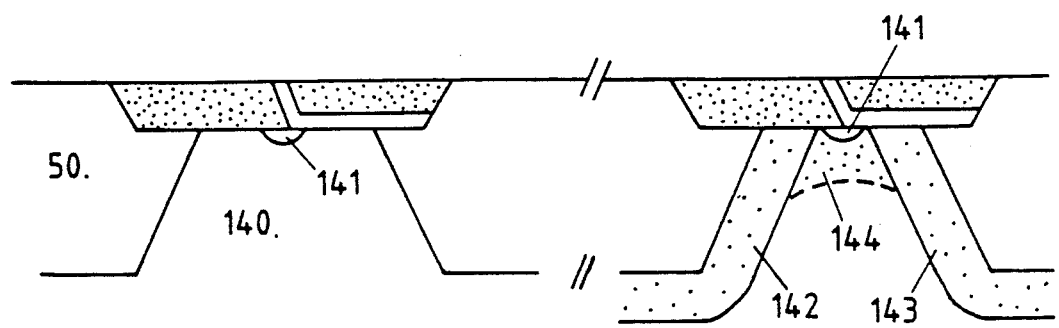
FIGS. 14 and 15 give a schematic view of the second mode of implementing the invention, according to the cavity-forming variant of FIG. 5.
Figure 15:
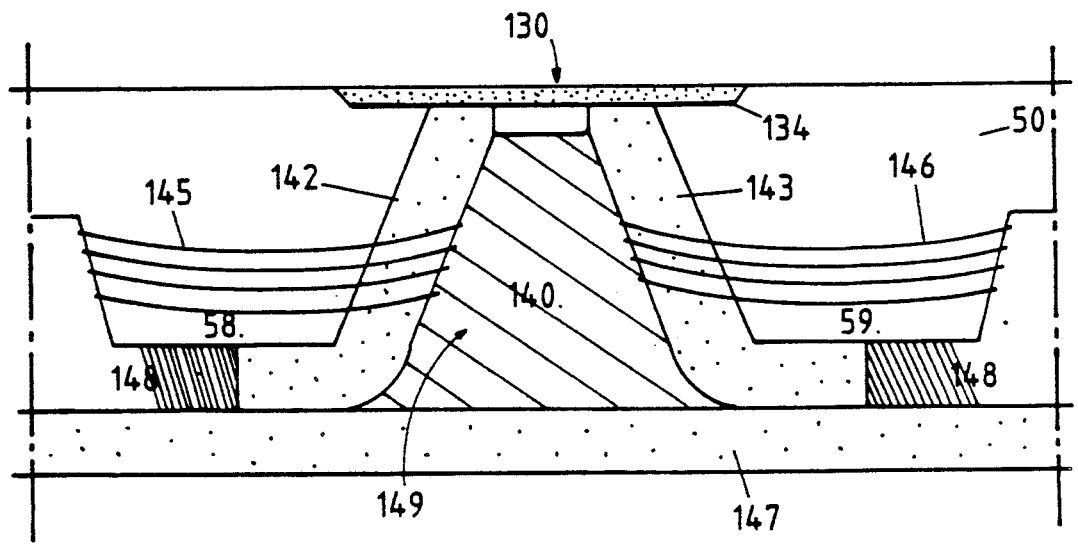

In the second method for making cavities, according to the invention, a single cavity 55 is made in the slab 50 of non-magnetic material, substantially at the plane 52 of the micro-break 51 hollowed out between two magnetic poles in the form of thin layers 53, 54. In this second method, the magnetic poles may advantageously be applied directly to the flanks 56, 57 of the single cavity 55, as illustrated in FIGS. 14 and 15. Advantageously, these cavities are actually made by machining projecting pads 58 and 59, having circular, quadrangular or other sections, in the second (lower) face of the slab 50 of non-magnetic material.

The purpose of the cavity-making operation is to minimize the thickness e between the bottom of the cavities 45, 46, 55 and the magnetic poles in the form of thin layers 43, 44; 53, 54. If necessary, and as illustrated further below, it is also possible to cancel this thickness.

Figure 6:
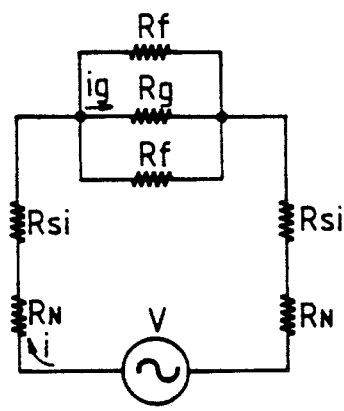
FIG. 6 is an equivalent electrical circuit diagram accompanying the table for computing the thickness of the calibrated spacing between the wire-wound magnetic cores and the magnetic poles made as thin layers, in a magnetic planar head according to the invention.
Figure 7:
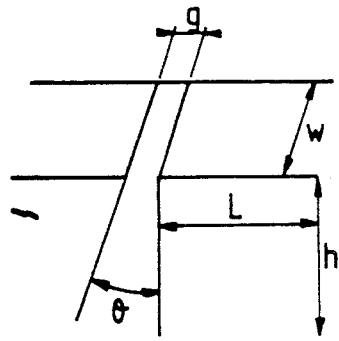
FIG. 7 is a diagram accompanying the same table, specifying the meaning of the notations used.

The computation note presented in TABLE 1, accompanying the FIGS. 6 and 7, shows that a maximum thickness e of 5 microns is acceptable.

Figure 8:
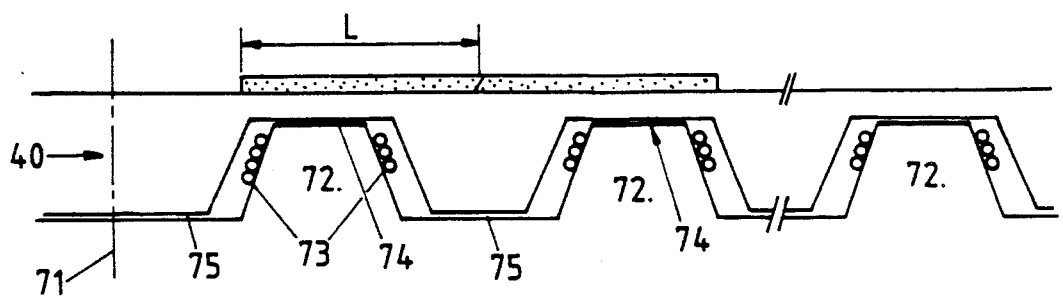
FIG. 8 is a diagram illustrating the first mode of implementing the method of the invention, in the case of a machined counter-piece made of ferrite, cooperating with the non-magnetic substrate with cavities of FIG. 4.

In the first mode of implementation, shown in FIG. 8, the wafer 40 with cavities cooperates with a counter-piece 71 of magnetic material, for example ferrite. In this counter-piece 71, pads 72 have been formed, for example by machining. These pads play the role of ferrite cores After a winding 73 has been wound around each pad, the counter-piece 71 is mounted on the second (lower) face of the slab 40, so as to make each wire-wound pad 72 penetrate a cavity.

The counter-piece 71 is fixedly joined by any means to the slab 40, for example by bonding by means of a CERAVAC (brand name) or any other type of bonder. The bonding zones are, for example, positioned in the bottom 74 of the cavities or, again, between the pads 72 of the ferrite counter-piece 71, depending on whether the supporting plane between the parts 40 and 71 is at one level or at the other. As an indication, the aperture at the base of each of the cavities may be of the order of 200 microns, for a length L of the order of 350 to 500 microns for each of the thin layer poles.

Figure 9:
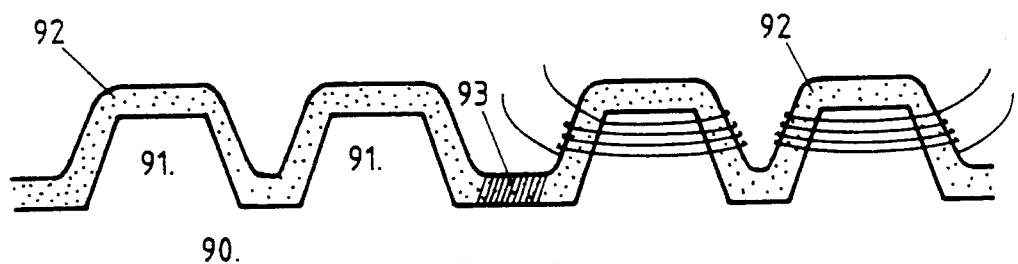
FIGS. 9 and 10 illustrate a second variant of the first mode of implementing the invention, in which the counter-piece cooperating with the non-magnetic slab with cavities is formed by a machined non-magnetic substrate coated with magnetic material and then wire-wound.
Figure 10:
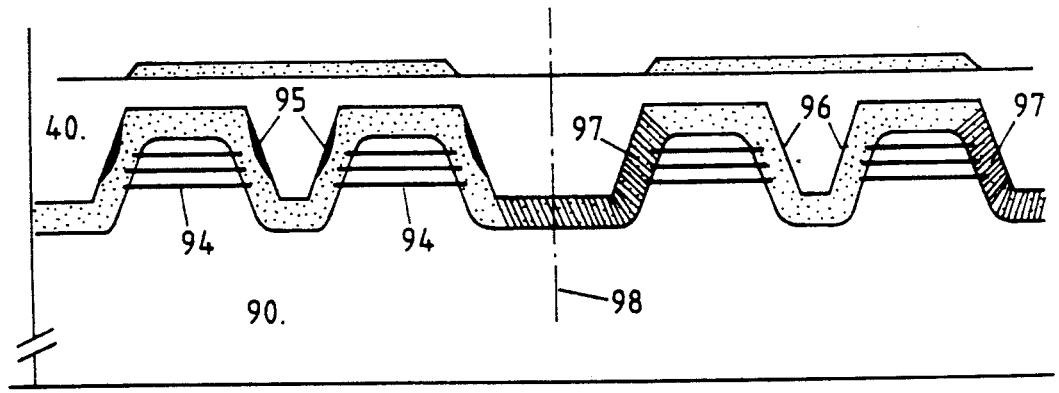

In the mode of implementation shown in FIGS. 9 and 10, the counter-piece 90 is made of a non-magnetic material, for example silicon, glass or Al$_2$O$_3$TiC (these examples of materials are given on a non-restrictive basis).

The counter-piece 90 is, for example, machined chemically so as to have poles 91, according to a geometry corresponding to that of the cavities of the slab 40. The poles are then coated with a deposit of magnetic material 92, for example Sendust which may or may not be laminated. A prior masking or a subsequent abrasion of the zones 93 between each pair of poles makes it possible to break the magnetic continuity from one planar head to an adjacent one.

Each of the coated poles 91, 92 is provided with a winding 94 later on.

As shown in FIG. 10, the counter-piece provided with wire-wound poles with magnetic coating is then mounted on the second (lower) face of the slab 40. Bonding zones 95 may be provided for the fixed joining of the parts 90 and 40.

If necessary, only one portion 96 of the poles of the counter-piece 90 may be coated with a magnetic material, the remaining portion 97 being left bare or coated with non-magnetic material.

As an indication, the height of the poles 91 may be of the order of 300 to 350 microns. The Sendust is advantageously deposited on a thickness of about 20 to 50 microns. The width of the coated poles is, for example, of the order of 250 microns. This corresponds approximately to the width of the cavity bottoms of the wafer 40.

The zones of transition between two adjacent planar heads extends, for example, on some millimeters. The heads are separated into individual units advantageously by being cut out along the sawing plane 98.

Figure 11:
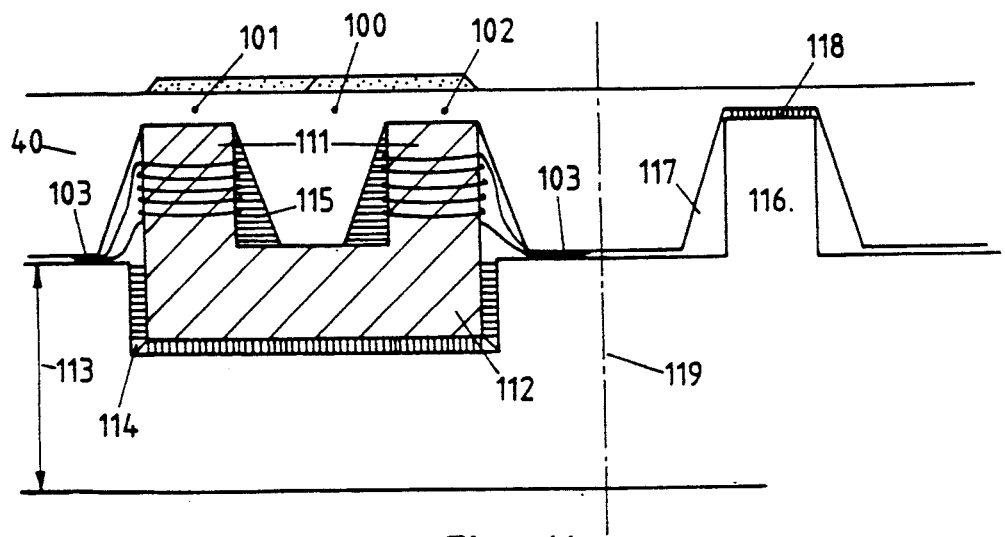
FIG. 11 illustrates a third variant of the first embodiment of the invention in which the magnetic cores have appeared in the form of modules inserted between the slab with cavities and a counter-piece made of non-magnetic material.

In the mode of implementation shown in FIG. 11, the ferrite cores 111 are twinned in pairs in the form of modules 112. Each module 112 is embedded between, firstly, the wafer 40 with cavities and, secondly, a counter-piece 113 provided with housings 114 for embedding the lower part of the modules 112 of magnetic cores 111.

The assembly is fixedly joined advantageously by bonding, for example at a location 115 for the connection of the modules 112 and the wafer 40 having cavities, and/or to the bottom of the embedding housing 114.

Advantageously, the counter-part 113 made of non-magnetic material is provided with additional pads 116, formed in the non-magnetic mass itself and designed to get embedded in a specific cavity 117 for fixed joining. The bottom of the cavity then forms a bonding zone 118 with the pad 116. These pads 116 may be used specifically for the operation for the batch manufacture of the planar heads, and may then removed during the operation for separating each planar head into an individual unit, for example by sawing along the cutting-out plane 119.

As an indication, the height of the module 112 may be of the order of 200 to 300 microns. The height Z of the counter-piece of magnetic material is, for example, of the order of 500 microns to 2 millimeters. This part may be made of silicon, $Al_2O_3$ or other materials.

It will be noted that the intermediate part 100 between the cavities and also, as the case may be, either or both of the solid layers 101, 102 separating the magnetic poles from the core module 112 may be eliminated. They are therefore replaced by the surrounding environment, i.e. generally air. In this case, the supporting surface of the assembly is formed by the planes 103 for connecting the parts 40 and 113, in which channels have been made, if necessary, for the winding wires to pass through.

Figure 12:
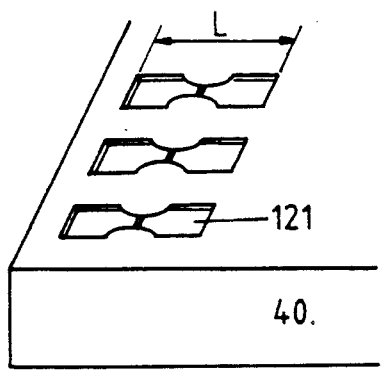
FIGS. 12 and 13 illustrate the variant of the invention according to which the magnetic poles made in thin layers are submerged in a slab made of non-magnetic material.
Figure 13:
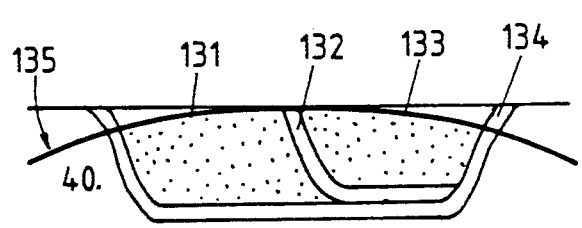

FIGS. 12 and 13 relate to an advantageous variant of the invention in which the thin layer magnetic poles with microgap are submerged in the first (upper) face of the wafer of non-magnetic material.

The submerging of the poles has many advantages, i.e. notably resistance to wear, as well as the elimination of the batch machining of the poles at the end of the manufacturing process.

The submerging is advantageously done after the silicon wafer 40 has been hollowed out, preferably by chemical machining, with appropriate resin masking. The submerging depth is about two to three microns, for example, with a length L of the order of 600 microns, for example, for the bow-ties 121.

As shown in FIG. 13, the poles are then deposited in the form of successive layers of Sendust 131, insulator material 132 such as $Al_2O_3$ and again Sendust 133. The thickness of the intermediate layer 132, made of $Al_2O_3$, is of the order of 0.2 microns for example.

If necessary, a preliminary layer 134 may be deposited before the three layers 131, 132, 133. This preliminary layer is advantageously a layer that is a barrier to the chemical machining of the substrate of the silicon wafer 40 and can be used, for example, in the method of FIGS. 14 and 15 described further below.

Before or after the planar heads are separated into individual units, the first (upper) face of the silicon slab is then advantageously polished so a to have a rounded profile 135 with high resistance to wear.

It is therefore seen that the submerged structure of the poles has the advantage of making it easy to create a rounded feature followed, if necessary, by the deposition of a protective layer. For example, if the poles of the planar head have a thickness of the order of two microns and a length of 200 microns, the radius of curvature that will be adapted to the ideal chord will have a maximum value of 20 millimeters. In this way, the poles always remain in a state of geometrical continuity with the profile of the head, irrespectively of the degree of wear and tear, since the head no longer has any specific leading edge.

The mode of implementation shown in FIGS. 14 and 15 corresponds to the use of the cavity structure shown in FIG. 5.

In this mode of implementation, a single cavity 140 is hollowed out in the lower face of the wafer 50 of non-magnetic material. This cavity 140 is, for example, made so that it reaches the chemical barrier layer 134 mentioned with respect to FIG. 13.

Advantageously, a localized resist layer 141 is deposited in the bottom of the cavity 140. This layer 141 is, for example, made of resin, $SiO_2$, $Al_2O_3$, Ceravac or other materials. A layer 142, 143 of magnetic material is then selectively deposited, in a substantially symmetrical way, on the two opposite flanks of the cavity 140. These two deposits 142, 143 are used to form the cores of each magnetic head, and these cores will subsequently be provided with a winding 145, 146 (FIG. 15).

If necessary, when the step for depositing the layers 142, 143 leads to the formation of a connecting bridge 144 of magnetic material, the bridge 144 is broken and removed by selective attacking of the resist layer 142, and then by a mechanical breaking action.

The magnetic material deposited on the layers 142, 143 is advantageously Sendust which may or may not be laminated.

As shown in FIG. 15, the windings 145, 146 are, for example, made to go round the pads 58, 59, the facing flanks of which are coated with Sendust layers 142, 143.

It will be noted that there is almost a junction between the magnetic cores 142, 143 and the poles 130 in thin layers, separated only by the chemical barrier layer 134.

The fixed joining of the assembly is done, for example, by mounting a connecting part 147, made of magnetic material, providing for the magnetic junction of the two poles 142, 143, on the second (lower) face of the wafer 50 made of non-magnetic material. The fixed joining is done, for example, by the bonding, in the connecting zones 148, of the magnetic wafer 147 with the pads 58, 58, made in the wafer 50 of non-magnetic material.

Advantageously, the cavity 140 is filled beforehand with an embedding material, for example Ceravac.

As an indication, it may be noted that the thickness of the layers 142, 143 of magnetic material deposited on the flanks of the cavity 140 may be of the order of 20 to 50 microns. A separation distance of the order of three to five millimeters may be provided for between each cavity 140.

TABLE 1

COMPUTATION OF THE MAXIMUM PERMISSIBLE THICKNESS "e"

If we assume, in relation with FIGS. 6 and 7, that:
$R_f$ = equivalent leakage resistance of the thin layer poles
$R_g$ = equivalent resistance of the microgap
$i_g$ = equivalent current crossing the microgap
$R_{Si}$ = equivalent resistance of the unmachined thickness of Si
$R_N$ = equivalent resistance of each ferrite core
g = width of the microgap
$i_t$ = total current
w = width of the poles (length of the microgap)
h = depth of the microgap
L = length of the thin layer poles
θ = angle of aperture of the microgap
e = thickness of the slab of Si between each core and the corresponding pole
S = ferrite/Sendust pole facing area we have $$i_g = \frac{R_F}{R_F + 2R_g} i_t$$

whence the efficiency:

$$\eta = \frac{R_g i_g}{\left(2R_N + 2R_{Si} + \frac{R_F R_g}{R_F + 2R_g}\right) i_t}$$

which corresponds to:

$$\eta = \frac{R_g R_F}{2(R_F + 2R_g)(R_N + R_{Si}) + R_F R_g}$$

When:

$$\bullet R_F >> R_g \quad \eta = \frac{R_g}{2(R_N + R_{Si}) + R_g}$$

To obtain η maximum, we must have: $2R_{Si} << R_g$ now $R_g \approx g/(w.h)$ and $R_{Si} = e/S$ with S: facing area of the poles (S=4.10⁴ μm²) if g=0.2 μm, h=2 μm, w=20 μm the e<<100 μm, i.e. e≈10 μm for example.

When:

$$.R \approx R_g$$

then $$\eta = \frac{R_g}{R_g + 6(R_N + R_{Si})}$$

the condition $6R_{Si} << R_g$ leads to e<<30 giving e≈3 μm

We have $R_g = g/(wh) = 5.10^{-3}$ $$R_F = \frac{\theta}{\mu_0 W_f L n \frac{(1 + 2L\sin\theta/2)}{g}}$$

In splitting up the bow-tie given by the two thin layer poles into two parts, in the form of two squares $R_1$ and $R_2$, respectively 100 μm square and 200 μm square, we arrive at $R_F = R_1 + R_2 = 4.10^{-3} + 1.6.10^{-3} = 5.6.10^{-3}$ whence $R_F = R_g$ We therefore have the case where $R_f \approx R_g$ and e is of the order of some microns.

A technological compromise of 5 μm is therefore acceptable.

What is claimed is:

1. A method for manufacturing magnetic heads with planar structure used for the encoding and reading of magnetic tapes, each of said magnetic heads having a microgap formed between two magnetic poles and facing a gap defined between two wire-wound ferrite cores, comprising the steps of:
   depositing said magnetic poles as thin layers on a first face of a wafer of non-magnetic material; and
   hollowing out, in an opposing face of said water, at least one housing cavity in which said wire-wound cores are disposed, said cores being disposed on a second wafer, so as to obtain a calibrated spacing or a junction between an upper part of said wire-wound cores and said thin layer magnetic poles.

2. A method for manufacturing magnetic heads with planar structure used for the encoding and reading of magnetic tapes, each of said magnetic heads having a microgap formed between two magnetic poles and facing a gap defined between two wire-wound ferrite cores, comprising the steps of:
   depositing said magnetic poles as thin layers on a first face of a wafer of non-magnetic material;
   hollowing out, in an opposing face of said water, at least one housing cavity in which said wire-wound cores are disposed, so as to obtain a calibrated spacing or a junction between an upper part of said wire-wound cores and said thin layer magnetic poles;
   forming said wire-wound cores at least in pairs, on a common substrate; and
   wire-wounding said cores before inserting said cores in batches in said housing cavities.

3. A method according to claim 2, comprising the common substrate for forming the wire-wound cores being of a monoblock counter-piece made of magnetic material, such as ferrite.

4. A method according to claim 2, comprising said common substrate for forming the wire-wound cores being at least one module made of magnetic material comprising at least one pair of cores, each module being inserted, after wire-winding of the cores, between said wafer of non-magnetic material and a holding counterpiece also made of non-magnetic material.

5. A method according to claim 2, wherein forming the cores comprises machining a common non-magnetic substrate so as to form pads therein, and then in depositing a magnetic material on at least a part of the surface of said pads.

6. A method according to claim 2, wherein said cavities are made so that they do not open out, said calibrated spacing being obtained by abutting said common substrate against the bottom of the cavities.

7. A method according to claim 2, wherein said cavities are made either to open out or not to open out, without discrimination, said calibrated spacing being obtained by abutting said common substrate against a supporting plane distinct from the bottom of the cavities.

8. A method for manufacturing magnetic heads with planar structure used for the encoding and reading of magnetic tapes, each of said magnetic heads having a microgap formed between two magnetic poles and facing a gap defined between two wire-wound ferrite cores, comprising the steps of:

depositing said magnetic poles as thin layers on a first face of a wafer of non-magnetic material;

hollowing out, in an opposing face of said wafer substantially at said microgap formed between said two thin layer magnetic poles, and at least one housing cavity, so as to obtain a calibrated spacing or a junction between an upper part of said wire-wound cores and said thin layer magnetic poles; and depositing a layer of magnetic material on two symmetrical portions of flanks of said cavity to form said pairs of cores associated with said microgap.

9. A method according to claim 8, comprising wire-winding said cores around said flank portions with said deposited layer of magnetic material after cutting out and separating into individual units all of the magnetic heads in the wafer.

10. A method according to claim 8, wherein hollowing out said at least one cavity comprises forming poles in said opposing face of the wafer made of non-magnetic material, and wherein said method further comprises forming windings around said poles with said flanks being at least partially coated with magnetic material.

11. A method according to claim 8, wherein depositing a layer of magnetic material on two symmetrical portions of the flanks of said cavity comprises the following steps:

depositing a resist layer at the bottom of said cavity;

depositing said magnetic material on said symmetrical flank portions of the cavity;

removing said resist layer;

breaking a bridge, if any, formed between said symmetrical deposits of magnetic material on the two symmetrical flank portions of the cavity.

12. A method according to claim 9, comprising filling said cavity with an embedding material after wire-winding said cores.

13. A method according to claim 8, comprising forming a magnetic junction between said deposits of symmetrical magnetic layers.

14. A method for manufacturing magnetic heads with planar structure used for the encoding and reading of magnetic tapes, each of said magnetic heads having a microgap formed between two magnetic poles and facing a gap defined between two wire-wound ferrite cores, said method comprising the steps of:

depositing said magnetic poles as thin layers on a first face of a wafer of non-magnetic material;

hollowing out, in an opposing face of said water, at least one housing cavity in which said wire-wound cores are disposed, so as to obtain a calibrated spacing or a junction between an upper part of said wire-wound cores and said thin layer magnetic poles; and at least partially submerging said thin layer poles with said microgap in cavities made in said first face of the wafer made of non-magnetic material.

15. A method according to claim 14, comprising forming said thin layer poles with microgaps by successively depositing a first thin layer of magnetic material, a thin layer of an insulator material and a second thin layer of magnetic material, said thin layer of insulator material defining a microgap between the two thin layers of magnetic material.

16. A method according to either of claims 14 or 15, comprising depositing a barrier layer before the deposition of said thin layer poles of magnetic material, said hollowing out said at least one cavity in said opposing face of the wafer of the non-magnetic baring said barrier layer.

17. A method according to claim 1, wherein said non-magnetic material is Si or $Al_2O_3TiC$.

18. A method according to claim 2, wherein the constituent material of said common substrate is ferrite.

19. A method according to claim 5, comprising depositing laminated or non-laminated Sendust as said magnetic material on said pads.

20. A method according to claim 1, implemented for the simultaneous batch production of a plurality of magnetic heads, comprising separating each of the magnetic heads into individual units by being cut out from said wafer.

* * * * *